(12) United States Patent
Gombrich

(10) Patent No.: US 6,170,408 B1
(45) Date of Patent: Jan. 9, 2001

(54) ADAPTIVE STAND FOR A VIDEO MONITOR

(76) Inventor: Scott Anthony Gombrich, 4758 Hersholt Ave., Long Beach, CA (US) 90808

( * ) Notice: Under 35 U.S.C. 154(b), the term of this patent shall be extended for 0 days.

(21) Appl. No.: 09/429,214

(22) Filed: Oct. 28, 1999

(51) Int. Cl.⁷ .................................................. A47B 13/08
(52) U.S. Cl. ..................... 108/90; 108/50.01; 108/145; 248/918
(58) Field of Search ................ 108/90, 145, 50.01, 108/50.02; 248/918, 924

(56) References Cited

U.S. PATENT DOCUMENTS

| | | |
|---|---|---|
| 2,581,023 * | 1/1952 | Jerick .................. 108/145 X |
| 4,682,750 * | 7/1987 | Rudolph et al. ............ 108/145 |
| 4,712,653 * | 12/1987 | Franklin et al. ............ 108/145 X |
| 4,949,650 | 8/1990 | Allard . |
| 5,240,119 | 8/1993 | Feldman . |
| 5,322,255 | 6/1994 | Garrett . |
| 5,377,598 | 1/1995 | Kirchner et al. . |
| 5,810,314 * | 9/1998 | Raziano ............. 248/918 X |
| 5,842,423 * | 12/1998 | Stanford ............. 108/90 X |
| 5,988,571 * | 11/1999 | Ward et al. ............. 248/918 X |

\* cited by examiner

*Primary Examiner*—Jose V. Chen
(74) *Attorney, Agent, or Firm*—Gene Scott-Patent Law & Venture Group

(57) ABSTRACT

A video monitor mounted support shelf or platform has adaptive support legs vertically adjustable for fitting a range of monitors and further provides a clamping device for attachment to the monitor's case without modification of the monitor's case. The adjustable legs are defined in two embodiments as the scissor adjustable type or as laterally displaced V-shaped legs having an adjustable divergent angle.

9 Claims, 2 Drawing Sheets

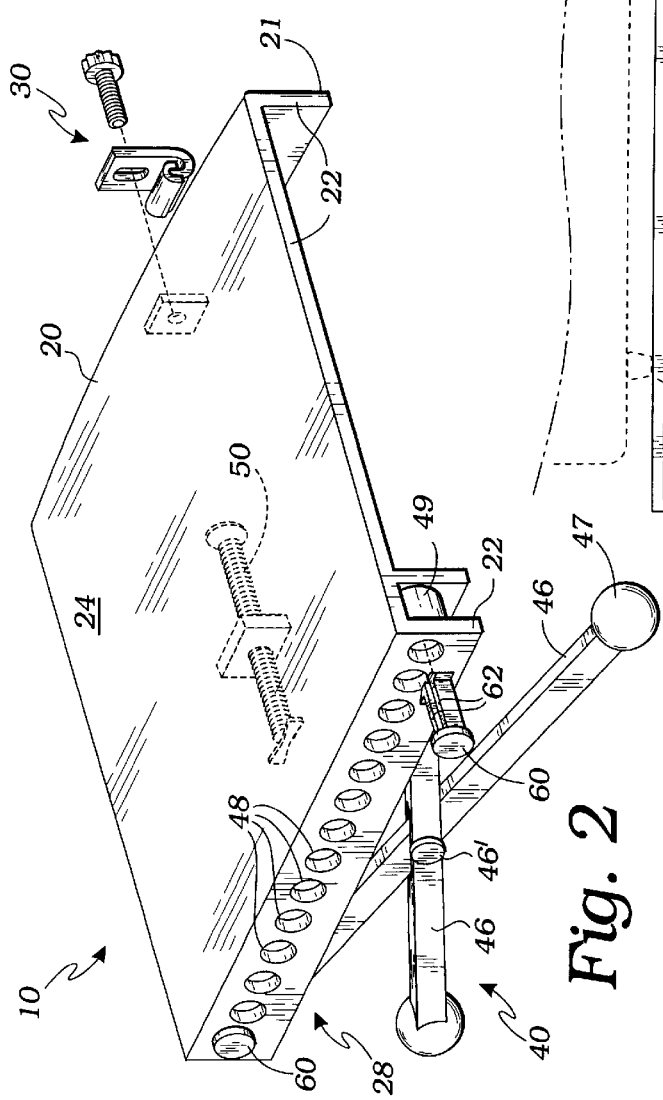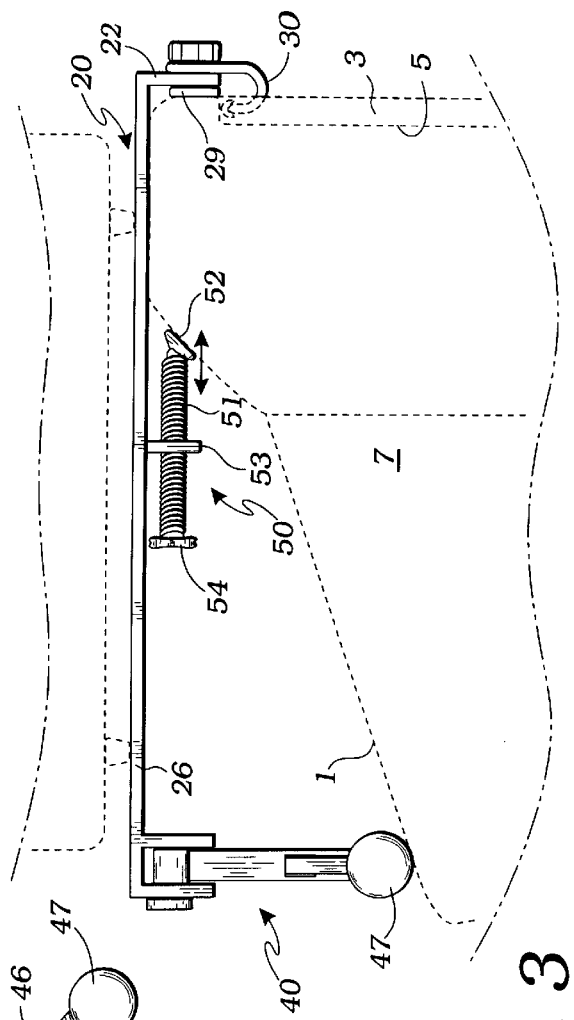

ADAPTIVE STAND FOR A VIDEO MONITOR

This application is based upon a previously filed Disclosure Document No. 428086 filed with the United States Patent Office on Nov. 18, 1997.

BACKGROUND OF THE INVENTION

1. Field of the Invention

This invention relates generally to stands and support apparatuses, and more particularly to a platform stand that is adaptive to the contours of a video monitor so as to hold devices, equipment and other items on the top of the monitor.

2. Description of Related Art

The following art defines the present state of this field:

Feldman, U.S. Pat. No. 5,240,119 describes a furniture unit for the support of a video set and video tape cassettes in conjunction with a television receiver, comprising a base element sized to be inserted under the television receiver, a first vertical side member rigidly attached to the base element at a position corresponding to one side of the television receiver, the vertical side member being configured to include storage racks for video cassettes, and a shelf element rigidly attached to the vertical element configured to support a video set above a television receiver, the major plane of the shelf element being parallel to the major plane of the base element.

Kirchner et al., U.S. Pat. No. 5,377,598 describes a desktop mount comprising a shelf and at least two spacers form mounting said shelf on a support, e.g., on a desktop. To ensure that the desktop mount can support technical end electronic equipment which can conveniently be operated each spacer consists of a swivel bracket, which comprises a bracket base, which is adapted to be secured to a desktop or other support, and a bracket arm, which is pirated to the bracket base and to the shelf on spaced apart vertical axes.

Garrett, U.S. Pat. No. 5,322,255 describes a mounting bracket which provides for attaching an accessory onto a display device or the like that allows the accessory to be readily attached to or removed from said display device, comprising a hooking portion shaped to cooperate with a front surface of said display device so as to locate said bracket; a mounting portion adapted to receive said accessory; and a stablishing portion providing a second point of location on said display device so as to provide stability between said bracket and said display device.

Allard, U.S. Pat. No. 4,949,650 describes a table adapted to be used as a coffee table having a top, all or part of which can be raised and moved laterally on struts forming a part of the legs of the table. The raised and moved portion is moved to a position where it can be used as an ordinary table for writing or the placement of food. The struts are slidable in the portion of the table used as legs and included alternate devices to support the raised part.

The prior art teaches brackets for use with video monitors, the closest of which to the present invention is the above reference to Garrett. However, the prior art does not teach that such a bracket or stand may be constructed in such a manner as to be mounted without modification of the monitor and to be adaptive to the wide range of monitor case conformations in the commercial market. The present invention fulfills these needs and provides further related advantages as described in the following summary.

SUMMARY OF THE INVENTION

The present invention teaches certain benefits in construction and use which give rise to the objectives described below.

The present invention provides a video monitor mounted support shelf or platform having adaptive support legs adjustable for fitting a range of monitors and further providing a clamping device for attachment to the monitor's case.

A primary objective of the present invention is to provide a shelf platform mountable onto a video monitor having advantages not taught by the prior art.

Another objective is to provide such a shelf platform that is fixed to a monitor without modification of the monitor.

A further objective is to provide such an apparatus that provides legs having vertical adjustment.

A still further objective is to provide such an apparatus that provides a clamp for securing the apparatus to the monitor's case.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a perspective view of a second preferred embodiment thereof; and

FIG. 3 is a side view thereof more explicitly showing a means of the invention for clamping a video monitor.

DETAILED DESCRIPTION OF THE INVENTION

Figure 1:
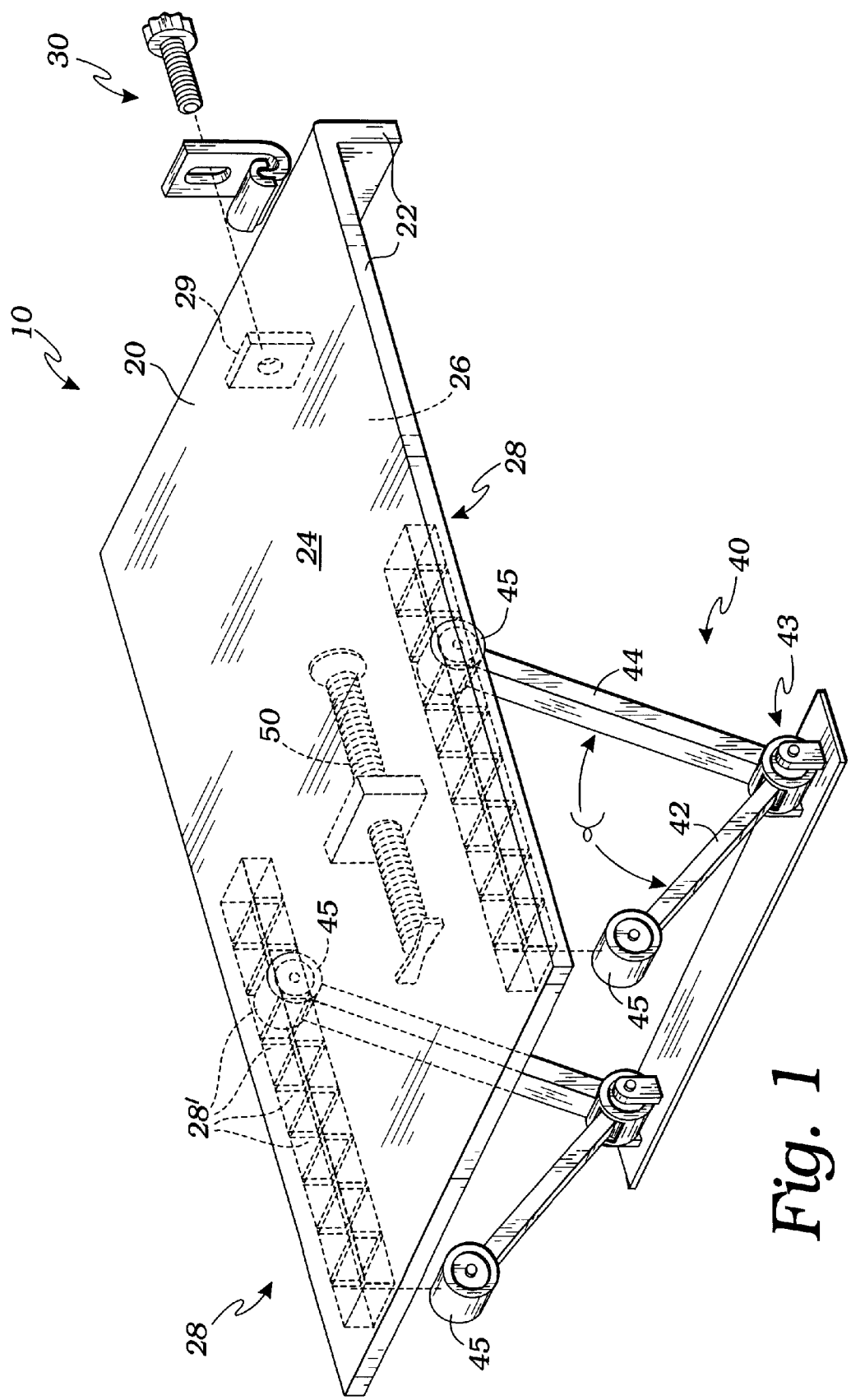
FIG. 1 is a perspective view of a first preferred embodiment of the present invention.

The above described drawing figures illustrate the invention, a stand apparatus 10 for use with a video monitor 1. The stand apparatus 10 comprises a rigid platform 20 providing a peripheral edge 22, an upfacing surface 24 and, in opposition thereto, a downfacing surface 26, and further provides a platform supporting means receiving means 28 integral with the downfacing surface 26 and which will be described in detail below, and a monitor hooking means receiving means 29 integral with the peripheral edge 22. The monitor hooking means receiving means, in the preferred embodiment is a nut which is fixed to, as shown in FIG. 3, or inset into (not shown), the peripheral edge 22 of the platform 20. The receiving means 29 may represent a double sided tape for adhesive engagement. The apparatus 10 further provides a monitor hooking means 30, such as the hook shaped bracket shown in the figures, which is engaged with the monitor hooking means receiving means 29, by for instance, a hand fastened threaded bolt as shown, so as to be positionable for hooking a screen rim 3 of a monitor screen 5 of the video monitor 1. The monitor hooking means 30 provides an elongated hole so that it may be adjusted vertically for monitors having a range of screen rim positions. The invention may be made without the monitor hooking means per se by substituting a monitor attachment means such as a double sided foam tape or the equal. Such an attachment tape may be placed between the platform or other part of the invention and the monitor case surface for assuring that the platform is immobile. Preferably the platform 20 provides a downwardly extending flange 21 for resting against a front surface of the video monitor 1. The apparatus 10 further comprises a platform supporting means 40, which will be described in detail below, engaged with the platform supporting means receiving means 28 wherein the platform supporting means 40 extends downwardly for contacting a case surface 7 of the video monitor 1 so as to support the platform 20 thereabove. Functionally, the apparatus further comprises a clamping means 50, such as the screw 51 mounted in a threaded stud 53 for threaded adjustment toward or away from the monitor screen 5, as best seen in FIG. 3, and which is mounted onto, and extending from the downfacing surface 26 of the platform 20, the clamping means 50 providing a pivoting clamping face 52 positioned for contact with the video monitor case surface 7 so as to sandwich the video monitor case surface 7 between the monitor hooking means 30 and the clamping means 50. Inventively, the clamping means 50 comprises a manual tightening means 54, such as a handle, as shown, for applying a rotation to the screw 51 so as to apply a clamping force on the video monitor case surface 7 so as to fix the invention to the monitor 1.

In a first embodiment of the present invention, as shown in FIG. 1, the platform supporting means 40 is a pair of elongate V-shaped rigid legs comprised of a pair of leg struts 42 and 44 having a divergent angle, alpha, defined therebetween. The struts 42, 44 are pivotally joined at 43 and are adjustable for selecting the divergent angle, alpha, of the rigid legs. The platform supporting means receiving means 28 is a pair of spaced apart linear receptacles, each of the linear receptacles providing a plurality of receptacle portals 28' and each of the pair of elongate V-shaped rigid legs 40 provides a pair of sockets 45 at proximal ends thereof, respectively, for tight-fitting engagement within a selected pair of the series of receptacle portals 28' of each of the linear receptacles so as to adjust the vertical height of the platform supporting means 40 and thus the platform 20 itself.

In a second embodiment shown in FIGS. 2 and 3, the platform supporting means 40 is a pair of elongate rigid legs 46 mutually, medially, pivotally engaged at 46' for scissors action in vertical adjustment of the rigid platform 20, and the platform supporting means receiving means 28 is a series of holes 48 arranged along the peripheral edge 22 of the platform 20 and depending downwardly therefrom. Each of the pair of elongate rigid legs 46 provides a tubular receiver 49 at a proximal end thereof, and further a pair of engagement pins 60 are enabled by spring action in a pair of resilient legs 62, for fixing the tubular receivers 49 at a selected pair of the series of holes 48 so as to scissorly adjust the vertical height of the platform supporting means 40 and thus the platform 20 itself.

In use, the invention allows the positioning of the platform 20 over the video monitor 1 so as to provide a flat mounting surface which may be used for storing remote control devices, or as is shown in FIG. 3, for mounting a decoder box or other electronic gear. The platform supporting means 40 is adjusted in height to accommodate the position and slope of the monitor case so that the platform is level. The monitor hooking means 30 is placed at the screen rim 3 and tightened using the nut shown, and then the screw 51 is tightened so that the platform 20 is fixed to the monitor case surface 7.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A stand apparatus for use with a video monitor, the apparatus comprising:

a platform providing a peripheral edge, an upfacing surface and, in opposition thereto, a downfacing surface;

a monitor attachment means integral with the platform for engaging the platform with the video monitor;

a platform supporting means receiving means integral with the downfacing surface;

a platform supporting means engaged with the platform supporting means receiving means, the platform supporting means extending downwardly selectively for contacting the video monitor so as to support the platform thereon in a generally horizontal attitude, and further, the platform supporting means providing a spherical contact surface for resting in contact with the monitor.

2. The apparatus of claim 1 further providing a monitor hooking means positionable for hooking a screen rim of a monitor screen of a video monitor.

3. The apparatus of claim 2 further comprising a clamping means mounted onto, and extending from the downfacing surface of the platform, the clamping means providing a pivoting clamping face positioned for contact with the video monitor so as to sandwich the video monitor between the monitor hooking means and the clamping means.

4. The apparatus of claim 3 wherein the clamping means comprises a manual tighting means for applying a clamping force to the video monitor.

5. The apparatus of claim 1 wherein the platform provides a downwardly extending flange for placement on a front surface of the video monitor so as to inhibit the platform from moving rearward on the monitor.

6. The apparatus of claim 1 wherein the platform supporting means is a pair of elongate rigid legs mutually, medially, pivotally engaged for scissors action in vertical adjustment of the rigid platform.

7. The apparatus of claim 6 wherein the platform supporting means receiving means is a series of holes arranged along the peripheral edge of the platform and each of the pair of elongate rigid legs providing a tubular receiver at a proximal end thereof, and further providing a pair of engagement pins for fixing the tubular receivers at a selected pair of the series of holes so as to adjust the vertical height of the platform supporting means.

8. The apparatus of claim 1 wherein the platform supporting means is a pair of elongate V-shaped rigid legs having a divergent angle defined by a pair of leg struts pivotally joined and adjustable for selecting the divergent angle of the rigid legs.

9. The apparatus of claim 8 wherein the platform supporting means receiving means is a pair of spaced apart linear receptacles, each of the linear receptacles providing a plurality of receptacle portals and each of the pair of elongate V-shaped rigid legs providing a pair of sockets at proximal ends thereof, respectively, for tight-fitting engagement within a selected pair of the series of receptacle portals of each of the linear receptacles so as to adjust the vertical height of the platform supporting means.

* * * * *